United States Patent
Gao et al.

(10) Patent No.: US 10,712,631 B2
(45) Date of Patent: Jul. 14, 2020

(54) DIFFRACTION DEVICE COMPRISING FIRST AND SECOND DIFFRACTION UNITS EACH HAVING A LIQUID CRYSTAL LAYER DISPOSED BETWEEN A DIFFRACTION LENS AND AN ELECTRODE

(71) Applicant: BOE TECHNOLOGY GROUP CO., LTD., Beijing (CN)

(72) Inventors: Jian Gao, Beijing (CN); Xiaochuan Chen, Beijing (CN); Wei Wang, Beijing (CN); Jifeng Tan, Beijing (CN); Xiandong Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 177 days.

(21) Appl. No.: 15/993,888

(22) Filed: May 31, 2018

(65) Prior Publication Data

US 2019/0094650 A1    Mar. 28, 2019

(30) Foreign Application Priority Data

Sep. 28, 2017 (CN) .......................... 2017 1 0898904

(51) Int. Cl.
*G02F 1/29* (2006.01)
*G02F 1/137* (2006.01)
(Continued)

(52) U.S. Cl.
CPC .............. *G02F 1/292* (2013.01); *G02F 1/137* (2013.01); *G02F 1/13362* (2013.01);
(Continued)

(58) Field of Classification Search
CPC ...... G02F 1/292; G02F 1/13471; G02F 1/137; G02F 2001/294
See application file for complete search history.

(56) References Cited

U.S. PATENT DOCUMENTS

2006/0280100 A1* 12/2006 Ooi ....................... G11B 7/1353
369/112.02
2007/0109489 A1* 5/2007 Nomura .................... G02F 1/29
349/200
(Continued)

FOREIGN PATENT DOCUMENTS

CN    1914674 A    2/2007
CN    1947055 A    4/2007
(Continued)

OTHER PUBLICATIONS

First Office Action for Chinese Patent Application No. 201710898904.4 dated Oct. 12, 2019.
(Continued)

*Primary Examiner* — Paul C Lee
(74) *Attorney, Agent, or Firm* — Calfee, Halter & Griswold LLP

(57) ABSTRACT

A first diffraction unit includes a first diffraction unit which includes a first substrate provided with a first polarizer on one side thereof and a first electrode on the other side thereof; a first diffraction lens provided on the first electrode; a second substrate provided opposite to the first substrate, a second electrode is provided on a side of the second substrate facing to the first substrate; and a first liquid crystal layer provided between the second electrode and the first diffraction lens, and having liquid crystal therein configured to be in a state in which the liquid crystal has a long axis direction parallel to an axial direction of an transmission axis of the first polarizer, or in a state in which the liquid crystal has a long axis direction perpendicular to an axial direction of an transmission axis of the first polarizer.

13 Claims, 5 Drawing Sheets

(51) Int. Cl.
  *G02F 1/13357* (2006.01)
  *G02F 1/1335* (2006.01)
  *G02F 1/1343* (2006.01)
  *G02F 1/1347* (2006.01)
(52) U.S. Cl.
  CPC .... *G02F 1/13471* (2013.01); *G02F 1/133526* (2013.01); *G02F 1/133528* (2013.01); *G02F 1/134309* (2013.01)

(56) References Cited

U.S. PATENT DOCUMENTS

| | | | | |
|---|---|---|---|---|
| 2007/0146625 | A1* | 6/2007 | Ooi | G02B 13/14 349/200 |
| 2007/0182915 | A1* | 8/2007 | Osawa | G11B 7/1378 349/201 |
| 2007/0183293 | A1* | 8/2007 | Murata | G02F 1/29 369/112.02 |
| 2019/0196297 | A1* | 6/2019 | Gao | G02F 1/29 |

FOREIGN PATENT DOCUMENTS

| | | | | |
|---|---|---|---|---|
| CN | 101040336 | A | | 9/2007 |
| CN | 101126840 | A | | 2/2008 |
| CN | 106226930 | A | | 12/2016 |
| CN | 106918917 | A * | 7/2017 | ....... G02F 1/133504 |
| CN | 106918917 | A | | 7/2017 |
| JP | 2005128518 | A | | 5/2005 |

OTHER PUBLICATIONS

Applied Optics, Ann. Liansheng, pp. 37-39, Beijing University of Technology Press, Feb. 2000.

* cited by examiner

DIFFRACTION DEVICE COMPRISING FIRST AND SECOND DIFFRACTION UNITS EACH HAVING A LIQUID CRYSTAL LAYER DISPOSED BETWEEN A DIFFRACTION LENS AND AN ELECTRODE

CROSS REFERENCE

The present disclosure claims priority to Chinese Patent Application No. 201710898904.4, filed on Sep. 28, 2017 and titled "Diffraction Device", and the entire contents thereof are incorporated herein by reference.

TECHNICAL FIELD

The disclosure relates to the field of diffractive lenses, and in particular to a diffraction device.

BACKGROUND

The lens is a basic optical device as seen everywhere in the optical apparatus. With the development of optical technology, the requirements for the lens are getting higher and higher. For example, the topography of the lens has become from a spherical surface into an aspherical surface of which in particular, the cylinder surface and the parabolic surface are most widely used. Moreover, there are also requirements on size and weight of the lens. For example, a Fresnel lens has advantages of small size, light weight and being easy to be reproduced and is widely used. However, the disadvantage of the existing lenses is that the functions are simple, the diffraction effect and the focal length are fixed, and cannot be flexibly changed according to the needs.

SUMMARY

According to one aspect of the present disclosure, a first diffraction unit includes a first diffraction unit which includes: a first substrate provided with a first polarizer on one side thereof and a first electrode on the other side thereof;
  a first diffraction lens provided on the first electrode;
  a second substrate provided opposite to the first substrate, a second electrode is provided on a side of the second substrate facing to the first substrate; and
  a first liquid crystal layer provided between the second electrode and the first diffraction lens, and having liquid crystal therein configured to be in a state in which the liquid crystal has a long axis direction parallel to an axial direction of a transmission axis of the first polarizer, or in a state in which the liquid crystal has a long axis direction perpendicular to an axial direction of a transmission axis of the first polarizer.

According to one embodiment of the present disclosure, the diffraction device further includes a second diffraction unit including:
  a third electrode provided on a side of the second substrate away from the first substrate;
  a third substrate provided symmetrical with the first substrate relative to the second substrate, and provided with a fourth electrode on a side thereof facing the second substrate and a second polarizer on a side thereof away from the fourth electrode;
  a second diffraction lens provided on the fourth electrode; and
  a second liquid crystal layer provided between the second diffraction lens and the third electrode, and having liquid crystal therein configured to be in a state in which the liquid crystal has a long axis direction parallel to an axial direction of a transmission axis of the second polarizer, or in a state in which the liquid crystal has a long axis direction perpendicular to an axial direction of a transmission axis of the second polarizer.

According to one embodiment of the present disclosure, the diffraction device includes a plurality pair of diffraction units, each pair including the first diffraction unit and the second diffraction unit, and the plurality pairs of diffraction units are arranged along the axial direction of the transmission axis of the first polarizer.

According to one embodiment of the present disclosure, the first diffraction lens has a focal length different from that of the second diffraction lens.

According to one embodiment of the present disclosure, when the liquid crystal in the first liquid crystal layer is in the state where the long axis direction of the liquid crystal is perpendicular to the axial direction of the transmission axis of the first polarizer, and the liquid crystal in the second liquid crystal layer is in the state where the long axis direction of the liquid crystal is parallel to the axial direction of the transmission axis of the second polarizer, the focal length of the object space in which the diffraction device is located and the focal length of the image space in which the diffraction device is located are of values $f_1$ and $f_1'$, respectively. When the liquid crystal in the first liquid crystal layer is in the state where the long axis direction of the liquid crystal is parallel to the axial direction of the transmission axis of the first polarizer and the liquid crystal in the second liquid crystal layer is in the state where the long axis direction of the liquid crystal is perpendicular to the axial direction of the transmission axis of the second polarizer, the focal distance of the object space where the diffraction device is located and the focal distance of the image side where the diffraction device is located are of values $f_2$ and $f_2'$, respectively.

$$\frac{f_1'}{f_1} = \frac{f_2'}{f_2} = -\frac{n_2}{n_1}$$

where $n_1$ is refractive index of medium in the object space in which the diffraction device is located, $n_2$ is refractive index of medium in the image space in which the diffraction device is located.

According to one embodiment of the present disclosure, when the liquid crystal in the first liquid crystal layer is in the state where the long axis direction of the liquid crystal is perpendicular to the axial direction of the transmission axis of the first polarizer and the liquid crystal in the second liquid crystal layer is in the state where the long axis direction of the liquid crystal is perpendicular to the axial direction of the transmission axis of the second polarizer, the focal distance of the object space where the diffraction device is located and the focal distance of the image side where the diffraction device is located are of values f and f, respectively. Here:

$$f = \frac{n_3 f_1 f_2}{n_1(d - f_1' + f_2)}$$

-continued $$f' = -\frac{n_3 f_1' f_2'}{n_2(d - f_1' + f_2')}$$

where $n_3$ is the refractive index of the medium between the first diffraction unit and the second diffraction unit, and d is the distance between the first diffraction lens and the second diffraction lens.

According to one embodiment of the present disclosure, both the first diffraction lens and the second diffraction lens have a plurality of steps, wherein the plurality of steps of the same diffraction lens are divided into a plurality of grating units, and the steps in the same grating unit has a height:

$$h = \frac{\frac{\lambda}{N}}{n - n_o}.$$

where $\lambda$ is the wavelength of the incident light, $n_0$ is the refractive index of the liquid crystal in the first liquid crystal layer in the state where the long axis direction of the liquid crystal is perpendicular to the axial direction of the transmission axis of the first polarizer or of the liquid crystal in the second liquid crystal layer in the state where the long axis direction of the liquid crystal is perpendicular to the axial direction of the transmission axis of the second polarizer, n is the refractive index of the first diffraction lens or the second diffraction lens, and N is the number of the steps included in each of the grating units.

According to one embodiment of the present disclosure, each stage of steps in each of the grating units correspond a ring zone having radii of $r_{j,\,1}$ and $r_{j,\,2}$, wherein $$r_{j,1} = \left[\left(-f_1 + \frac{(2j-1)\frac{\lambda}{2}}{n_1}\right)^2 - f_1^2\right]^{1/2} = \sqrt{\frac{-(2j-1)f_1\lambda}{n_1}}\left(1 - \frac{(2j-1)\lambda}{4n_1 f_1}\right)^{1/2}$$

$$r_{j,2} = \left[\left(-f_1 + \frac{j\lambda}{n_1}\right)^2 - f_1^2\right]^{1/2} = \sqrt{\frac{-2jf_1\lambda}{n_1}}\left(1 - \frac{j\lambda}{2n_1 f_1}\right)^{1/2}$$

where $f_1$ represents the focal length of the first diffraction lens or the second diffraction lens, j represents the sequence number of the grating units, and $n_1$ represents the refractive index of the medium in the object space in which the diffraction device is located.

According to one embodiment of the present disclosure, the second substrate is provided on a side thereof facing the first substrate with a fifth electrode on which a first insulation layer is provided. The second electrode is provided on the first insulation, and has a polarity opposite to that of the fifth electrode.

According to one embodiment of the present disclosure, the second substrate is provided on a side away from the first substrate with a sixth electrode on which a second insulation layer is provided. The third electrode is provided on the second insulation layer, and has a polarity opposite to that of the sixth electrode.

According to one embodiment of the present disclosure, both the second electrode and the third electrode are strip electrodes.

ng to one embodiment of the present disclosure, both the all of the first electrode, the fourth electrode, the fifth electrode and the sixth electrode are surface electrodes.

According to one embodiment of the present disclosure, when the long axis direction of the liquid crystal in the first liquid crystal layer is parallel to the axial direction of the transmission axis of the first polarizer, the refractive index of the first liquid crystal layer is the same as the refractive index of the first diffraction lens.

According to one embodiment of the present disclosure, when the long axis direction of the liquid crystal in the second liquid crystal layer is parallel to the axial direction of the transmission axis of the second polarizer, the refractive index of the second liquid crystal layer is the same as the refractive index of the second diffraction lens.

DETAILED DESCRIPTION

The present disclosure will be described in detail below with reference to the accompanying drawings.

Figure 1:
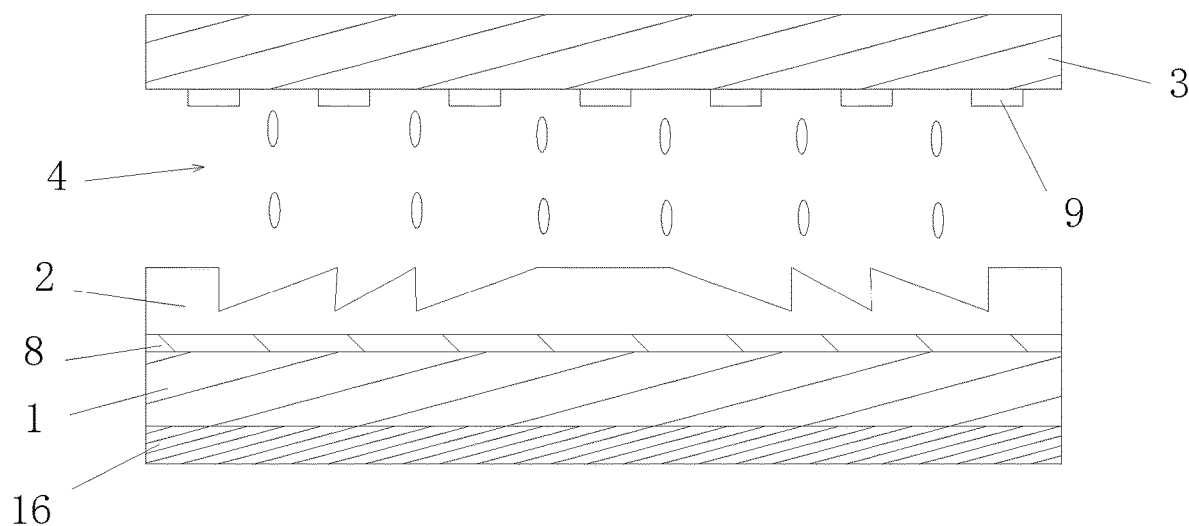
FIG. 1 is a schematic structural view of a diffraction device according to the first embodiment of the present disclosure in a state in which the liquid crystal in the first liquid crystal layer has been deflected by a vertical electric field.
Figure 2:
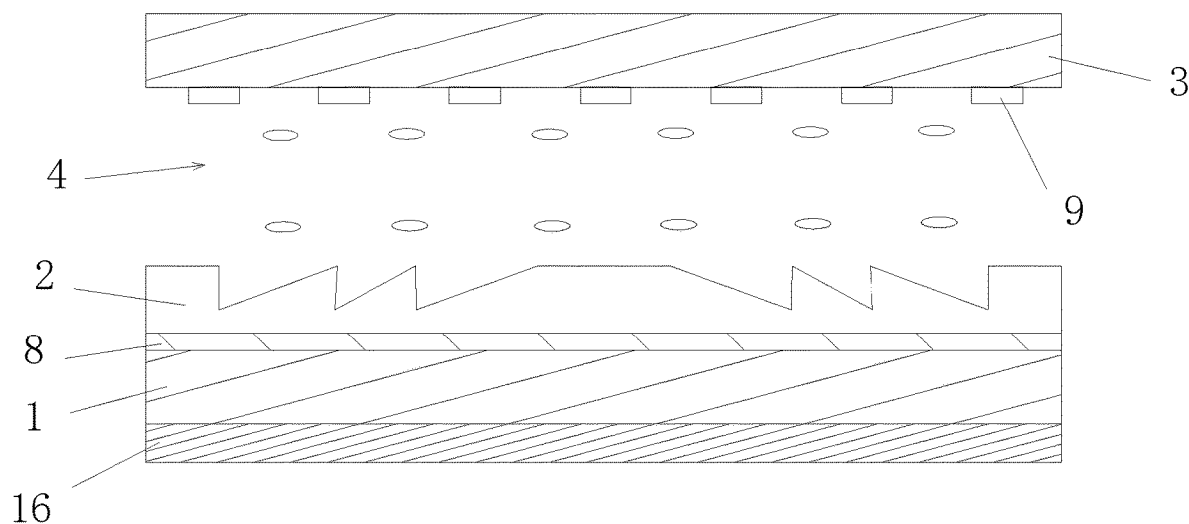
FIG. 2 is a schematic structural view of a diffraction device according to the first embodiment of the present disclosure in a state in which the liquid crystal in the first liquid crystal layer has been deflected by a horizontal electric field.
Figure 5:
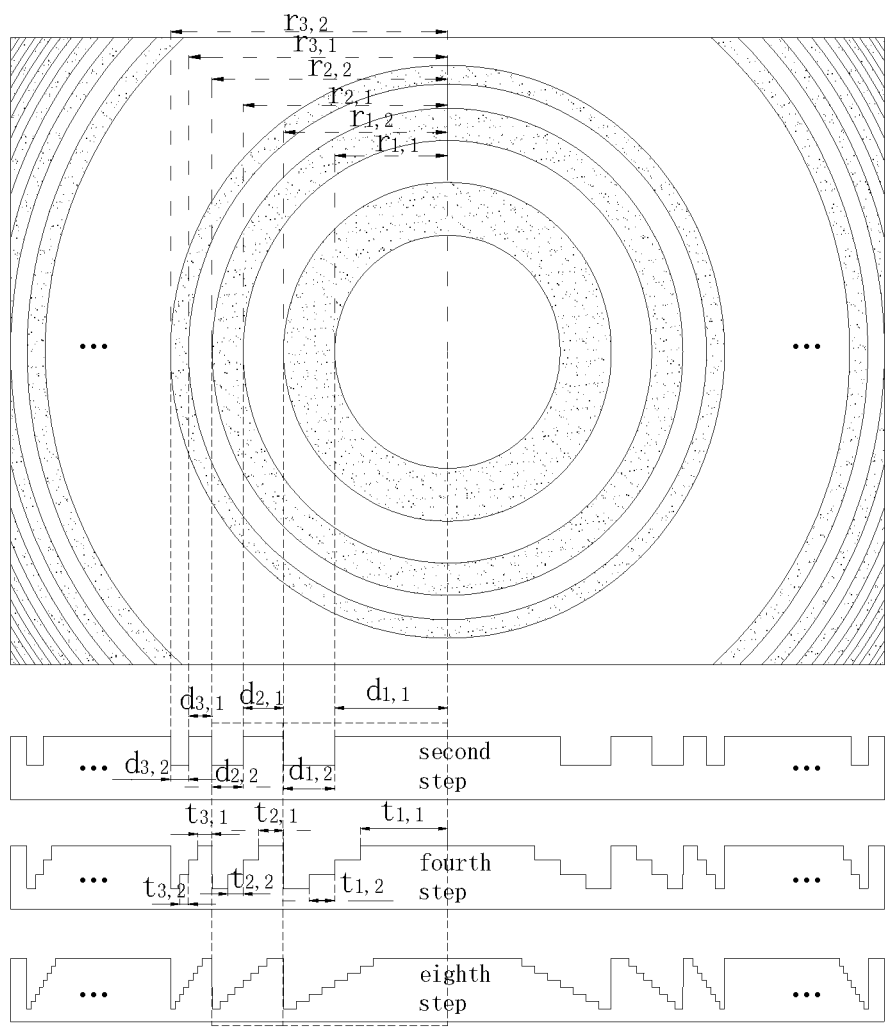
FIG. 5 is a schematic structural view of the diffraction lens of the present disclosure which is a spherical lens, in which the relationship between the stages of steps and the grating units in the diffraction lens and the corresponding step widths are shown.
Figure 6:
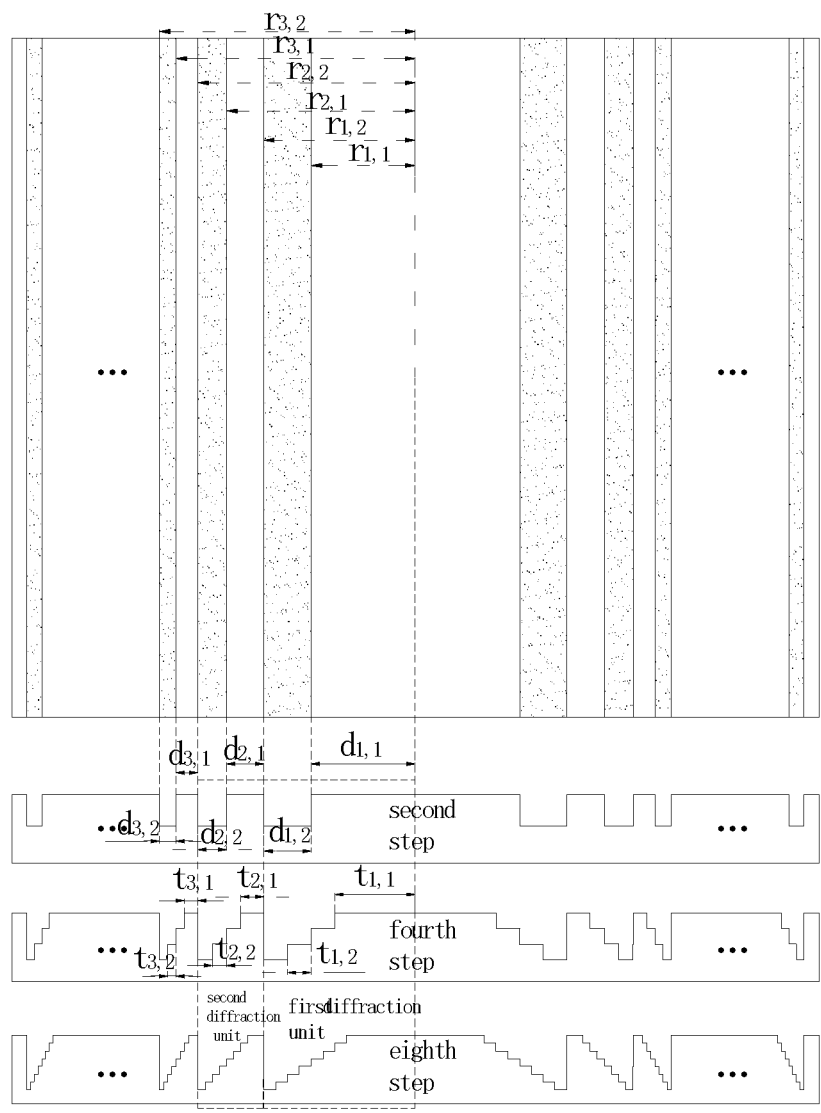
FIG. 6 is a schematic structural view of the diffraction lens of the present disclosure which is a cylindrical lens, in which the relationship between the stages of steps and the grating units in the diffraction lens and the corresponding step widths are shown.

As shown in FIG. 1 and FIG. 2, the first embodiment of the present disclosure provides a diffraction device including a first diffraction unit. The first diffraction unit includes:
  a first substrate 1 provided with a first polarizer 16 on one side thereof and a first electrode 8 on the other side thereof;
  a first diffraction lens 2 provided on the first electrode 8;
  a second substrate 3 provided opposite to the first substrate 1, and provided on a side thereof facing to the first substrate 1 with a second electrode 9; and
  a first liquid crystal layer 4 provided between the second electrode 9 and the first diffraction lens 2. When the first electrode 8 and the second electrode 9 are electrified, a vertical electrical field perpendicular to the first and second substrates 1 and 3 is generated between the first electrode 8 and the second electrode 9. The liquid crystal in the first liquid crystal layer 4 is deflected by the vertical electric field such that the long axis direction of the liquid crystal is perpendicular to the axial direction of the transmission axis of the first polarizer 16. In this case, the liquid crystal in the first liquid crystal layer 4 has a refractive index of $a_0$ for the incident polarized light, and the first diffraction unit as a whole functions as a diffraction lens. When it is required to allow the first diffraction unit to function as a spherical lens or a cylindrical lens, the effect of a spherical or cylindrical lens may be achieved by attaching an etched ring-shaped or strip-shaped phase diffraction grating on the first substrate 1 or the second substrate 3 as shown in FIGS. 5 and 6. When the first electrode 8 is not electrified while the adjacent second electrodes 9 are supplied with positive and negative voltages, respectively, a horizontal electric field is generated between the first substrate 1 and the second substrate 3. The liquid crystal in the first liquid crystal layer 4 is deflected by the horizontal electric field such that the long axis direction of the liquid crystal is parallel to the axial direction of the transmission axis of the first polarizer 16. In this case, the first liquid crystal layer 4 has a refractive index of $a_1$ for the incident polarized light, $a_1>a_0$, and the first diffraction unit amounts to a plate glass, that is, the refractive index of the liquid crystal in the first liquid crystal layer 4 is the same as that of the first diffraction lens 2.

With the diffraction device of the present disclosure, the user can switch the first diffraction unit between the lens and the plate glass by changing the way of power on and off of the first electrode 8 and the second electrode 9, to allow the first diffraction unit to change function following the user's need.

Figure 3:
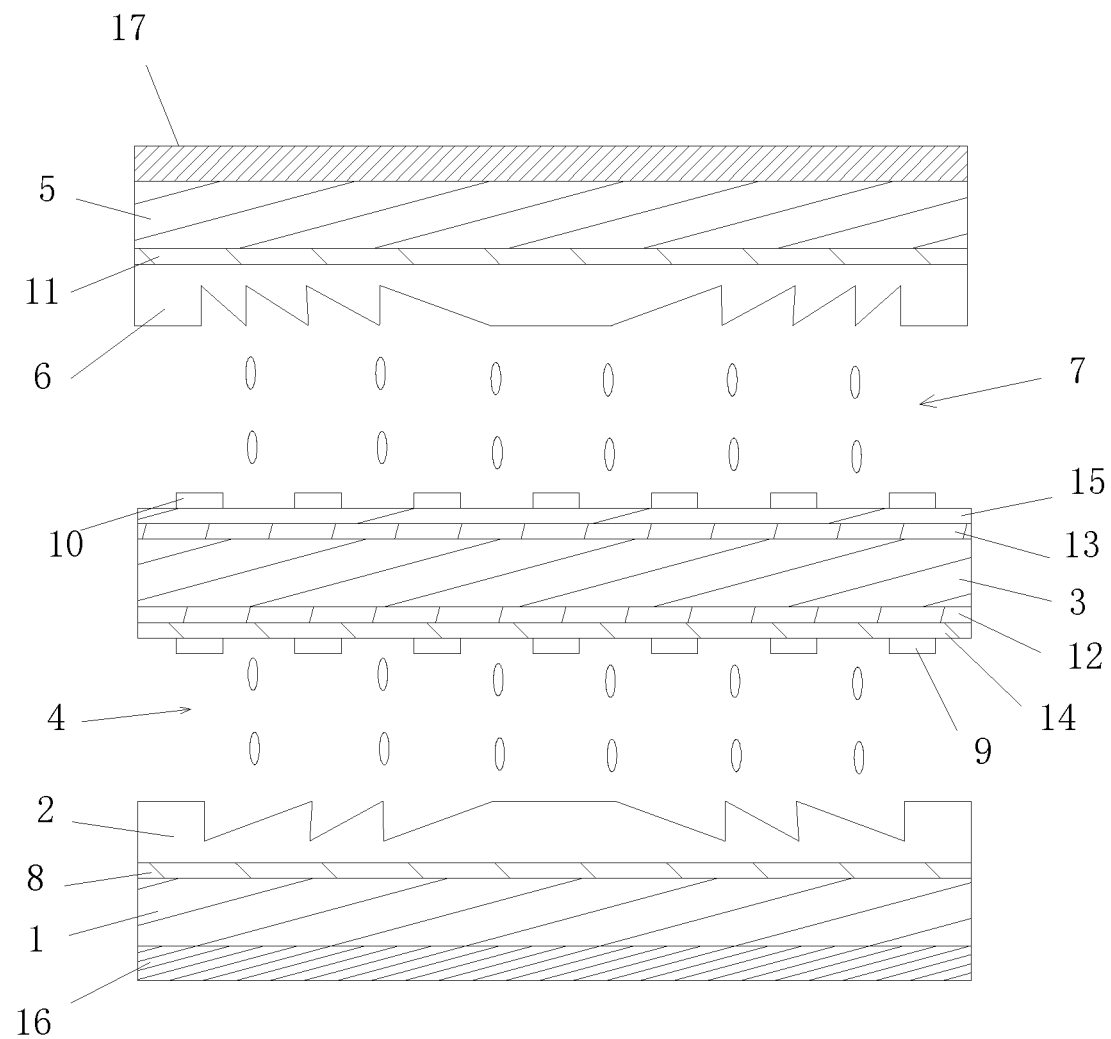
FIG. 3 is a schematic structural view of a diffraction device according to the second embodiment of the present disclosure in a state in which the liquid crystal in both the first and the second liquid crystal layers has been deflected by a vertical electric field.
Figure 4:
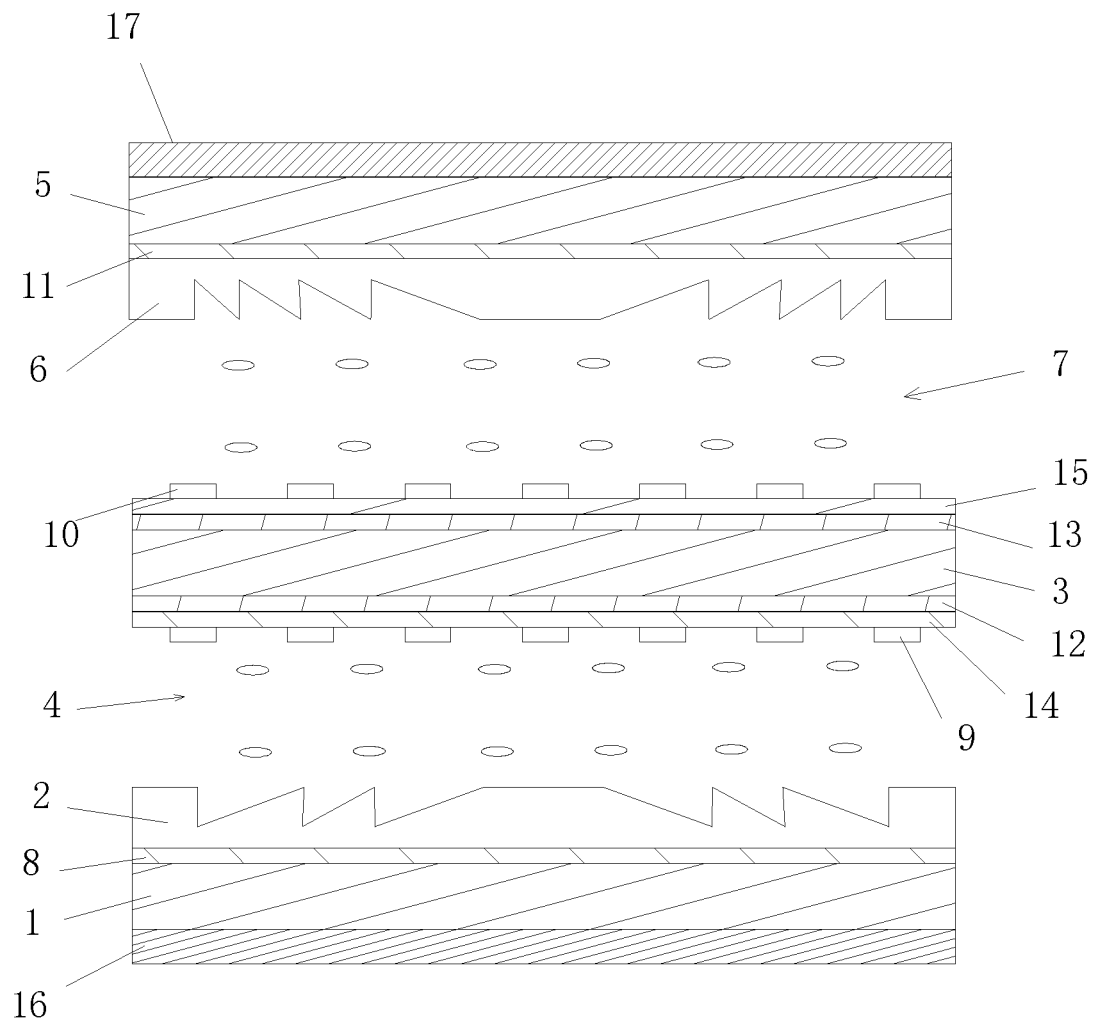
FIG. 4 is a schematic structural view of a diffraction device according to the second embodiment of the present disclosure in a state in which the liquid crystal in both the first and the second liquid crystal layers has been deflected by a horizontal electric field.

As shown in FIG. 3 and FIG. 4, the second embodiment of the diffraction device according to this embodiment also includes a second diffraction unit. The second diffraction unit includes:

a third electrode 10 provided on a side of the second substrate 3 away from the first substrate 1;

a third substrate 5 provided symmetrical with the first substrate 1 relative to the second substrate 3, and provided with a fourth electrode 11 on a side thereof facing the second substrate 3 and a second polarizer 17 on a side thereof away from the fourth electrode 11, the second polarizer 17 having a transmission axis parallel to the transmission axis of the first polarizer 16, and both the transmission axes being parallel to the direction of the horizontal electric field between the second substrate 3 and the third substrate 5;

a second diffraction lens 6 provided on the fourth electrode 11; and a second liquid crystal layer 7 provided between the second diffraction lens 6 and the third electrode 10. When the third electrode 10 and the fourth electrode 11 are electrified, a vertical electrical field perpendicular to the third substrates 5 and the second substrates 3 is generated between the two electrodes. The liquid crystal in the second liquid crystal layer 7 is deflected by the vertical electric field such that the long axis direction of the liquid crystal in the second liquid crystal layer 7 is perpendicular to the axial direction of the transmission axis of the second polarizer 17. In this case, the liquid crystal layer 7 has a refractive index of $a_2$ for the incident polarized light, different from that of the second diffraction lens 6, and the second diffraction unit may function as spherical or cylindrical lens based on the diffraction grating provided on the third substrate 5 or the second substrate 3. When the third electrode 10 is not electrified while the fourth electrode 11 is electrified, a horizontal electric field is generated between the third substrate 5 and the second substrate 3. The liquid crystal in the second liquid crystal layer 7 is deflected by the horizontal electric field such that the long axis direction of the liquid crystal is parallel to the axial direction of the transmission axis of the second polarizer 17. In this case, the second liquid crystal layer 7 has a refractive index of $a_3$ for the incident polarized light, $a_3>a_2$, and the second diffraction unit amounts to a plate glass. That is, in this case, the refractive index of the liquid crystal in the second liquid crystal layer 7 is the same as that of the first diffraction lens 2.

The number of the first diffraction unit and the second diffraction unit is not limited. The diffraction device according to an embodiment of the present disclosure may include a plurality pairs of diffraction units, each pair of diffraction units including the first diffraction unit and the second diffraction unit. The plurality pairs of diffraction units may be arranged, for example, in the axial direction of the transmission axis of the first polarizer.

Further, the second electrode 9 and the third electrode 10 may be arranged with alternating positive and negative electrodes such that they can generate a horizontal electric field when being electrified. However, in order to enhance the stability of the horizontal electric field, continue referring to FIG. 3 and FIG. 4, in the embodiment, the electrodes can be arranged as follows:

A fifth electrode 12 is provided on a side of the second substrate 3 facing the first substrate 1, a first insulation layer 14 is provided on the fifth electrode 12, the second electrode 9 is provided on the first insulation layer 14, and the polarity of the second electrode 9 is set opposite to the polarity of the fifth electrode 12 such that it can generate a horizontal electric field with the fifth electrode 12. Also a sixth electrode 13 is provided on the other side of the second substrate 3, a second insulation layer 15 is provided on the six electrodes 13, the third electrode 10 is provided on the second insulation layer 15, and the polarity of the third electrode 10 is set to be opposite to the polarity of the sixth electrode 13 such that it can generate a horizontal electric field with the sixth electrode 13. Here, the second electrode 9 and the third electrode 10 are strip electrodes. The first electrode 8, the fourth electrode 11, the fifth electrode 12, and the sixth electrode 13 are surface electrodes. Of course, the second electrode 9 and the third electrode 10 may also be ring electrodes.

For specific applications, the user may arbitrarily select any one of the two diffraction units as a diffraction lens as required, or select both as diffraction lenses such that the diffraction effects of the two diffraction units are mixed to achieve a diffraction effect different from any of the diffraction units. Specifically, when the refractive index of the first liquid crystal layer 4 is $a_0$ and the refractive index of the second liquid crystal layer 7 is $a_3$, i.e., when the fifth electrode 12 and the second electrode 9, and the third electrode 10 and the sixth electrode 13 are electrified, while the first electrode 8 and the fourth electrode 11 are not electrified, such that the second diffraction unit amounts to the plate glass, while the second electrode 9 and the fifth electrode 12 generate a vertical electric field to guide the liquid crystal in the first liquid crystal layer 4 to deflect such that the long axis direction of the liquid crystal is perpendicular to the transmission axis of the first polarizer 16. The first diffraction unit in this state functions as a focusing lens.

The focal distance of the object space in which the diffraction device is located and the focal length of the image space in which the diffraction device is of values $f_1$ and $f_1'$, which may be obtained by actual measurement, and satisfy the following relationship:

$$\frac{f_1'}{f_1} = -\frac{n_2}{n_1} \quad \text{Formula 1}$$

When the refractive index of the first liquid crystal layer 4 is $a_1$ and the refractive index of the second liquid crystal layer 7 is $a_2$, i.e., when the second electrode 9 and the fifth electrode 12, and the sixth electrode 13 and the fourth electrode 11 are electrified, while the third electrode 10 and the first electrode 8 are not electrified, such that the first diffraction unit amounts to the plate glass, while the fourth electrode 11 and the sixth electrode 13 generate a vertical electric field to guide the liquid crystal in the second liquid crystal layer 7 to deflect such that the long axis direction of the liquid crystal is perpendicular to the transmission axis of the second polarizer 17. The second diffraction unit in this state functions as a focusing lens. The focal length of the object space in which the diffraction device is located and the focal length of the image space in which the diffraction device is located are of values $f_2$ and $f_2'$, respectively, which may be actually measured, and satisfy the following relationship:

$$\frac{f_2'}{f_2} = -\frac{n_2}{n_1} \quad \text{Formula 2}$$

When the refractive index of the first liquid crystal layer 4 is $a_0$, and the refractive index of the second liquid crystal layer 7 is $a_2$, i.e., when the sixth electrode 13, the fourth electrode 11, the fifth electrode 12, and the first electrode 8 are electrified at the same time, while the second electrode 9 and the third electrode 10 are not electrified, such that both the fourth electrode 11 and the sixth electrode 13, and the first electrode 8 and the fifth electrode 12 generate a vertical electric field to guide the liquid crystal in the first liquid crystal layer 4 and the second liquid crystal layer 7 to deflect such that the long axis directions of the liquid crystal are perpendicular to the transmission axes of the corresponding polarizers. Both the first diffraction unit and the second diffraction unit in this state act as a focusing lens. The focal length of the object space in which the diffraction device is located and the focal length of the image space in which the diffraction device is located are of values f and f', respectively, for which the calculating formulae are:

$$f = \frac{n_3 f_1 f_2}{n_1(d - f_1' + f_2)} \quad \text{Formula 3}$$

$$f' = -\frac{n_3 f_1' f_2'}{n_2(d - f_1' + f_2)} \quad \text{Formula 4}$$

In Formulae 1-4, $n_1$ is the refractive index of the medium in the object space in which the diffraction device is located, $n_2$ is the refractive index of the medium in the image space in which the diffraction device is located, $n_3$ is the refractive index of the medium between the first diffraction unit and the second diffraction unit, and d is the distance between the first diffraction lens 2 and the second diffraction lens 6. Based on these formulae, the user can calculate the refractive index of the entire diffraction device when both diffraction units are simultaneously used as the diffraction lens.

Further, the focal length of the first diffraction lens 2 and the focal length value of the second diffraction lens 6 in the present embodiment are different. The user may select an adapted diffraction lens according to actual needs to prepare a diffraction device. Using this kind of setting way can increase the operation range of the diffraction lens and meet more needs of the user, such that the user can choose to activate the diffraction unit(s) with different focal lengths as needed to achieve the desired effect.

As shown in FIG. 3, the first diffraction lens 2 and the second diffraction lens 6 each have multiple stages of steps. Diffraction lenses with different number of stages of steps have different diffraction efficiencies, and the more the number of the stages of steps, the higher the diffraction efficiency. For example, the diffraction efficiency of a diffraction lens with four stages of steps is lower than that of diffraction lens with eight stages of steps. Further, the multiple stages of steps in the same diffraction lens are divided into multiple groups, and each group of steps forms a grating unit. For example, the diffraction lens includes a first to a Mth phase grating units, and M is a positive integer. Here, each grating unit includes N=2^m (m=1, 2, 3, . . . ) steps, and the phase difference between two adjacent steps is $2\pi/N$. Since the step height mainly determines the refractive index of the diffraction lens, the user can calculate the height of each stage of steps of the required diffraction lens in advance according to the refractive index of the required diffraction lens, such that the user can select an appropriate diffraction lens depending on height. This embodiment provides a formula for calculating the height of the stages of steps, which is specifically as follows:

$$h = \frac{\lambda/N}{n - n_o}, \quad \text{Formula 5}$$

where $\lambda$ is the wavelength of the incident light, $n_0$ is $a_0$ or $a_2$, n is the refractive index of the first diffraction lens 2 or the second diffraction lens 6, and N is the number of stage of the steps contained in each grating unit.

According to one embodiment of the present disclosure, in order to allow the user to select the adapted diffraction lens more accurately according to the refractive index of the diffraction lens as required such that the diffraction device can achieve the diffraction effect required by the user, further limitation may be made to radii of the ring zones, respectively $r_{j,1}$ and $r_{j,2}$, corresponding to the stages of steps in each grating unit. Specifically, the calculation may be made base on the following formula:

$$r_{j,1} = \left[\left(-f_1 + \frac{(2j-1)\lambda/2}{n_1}\right)^2 - f_1^2\right]^{1/2} = \sqrt{\frac{-(2j-1)f_1\lambda}{n_1}}\left(1 - \frac{(2j-1)\lambda}{4n_1 f_1}\right)^{1/2} \quad \text{Formula 6}$$

$$r_{j,2} = \left[\left(-f_1 + \frac{j\lambda}{n_1}\right)^2 - f_1^2\right]^{1/2} = \sqrt{\frac{-2jf_1\lambda}{n_1}}\left(1 - \frac{j\lambda}{2n_1 f_1}\right)^{1/2} \quad \text{Formula 7}$$

where $f_1$ represents the focal length of the first diffraction lens 2 or the second diffraction lens 6, j represents the sequence number of the grating units, and $n_1$ represents the refractive index of the medium in the object space in which the diffraction device is located.

With reference to FIG. 3, taking j=2 as an example, that is, taking two stages of steps as an example, according to Formulae 6 and 7, it can be seen that the two stages of steps of the diffraction lens have widths of two steps, respectively:

$$d_{j,1} = r_{j,1} - r_{j-1,2} \quad \text{Formula 8}$$

$$d_{j,2} = r_{j,2} - r_{j,1} \quad \text{Formula 9}$$

For a diffraction lens with N stages of steps, each grating unit has N−1 stages of steps with the same width, and the width of the remaining steps is different from the width of the N−1 stages of steps described above. For example, the continuous N−1 steps in the jth grating unit has a width:

$$t_{j,2} = \frac{d_{j,2}}{N/2} \quad \text{Formula 10}$$

The width of the remaining steps in the jth grating unit is:

$$t_{j,1} = d_{j,1} - \sum_{i=1}^{m-1} \frac{d_{j,2}}{2^i} \quad \text{Formula 11}$$

For example, in the case of a diffraction lens with eight stages of steps, it can be determined from Formulae 10 and 11 that the width of the seven same steps in the first grating unit (j=1) is $$t_{1,2} = \frac{d_{1,2}}{4},$$

while the width of the remaining one step is $$t_{1,1} = d_{1,1} - \frac{d_{1,2}}{2} - \frac{d_{1,2}}{4}.$$

The width of the seven same steps in the second grating unit is $$t_{2,2} = \frac{d_{2,2}}{4},$$

while the width of the remaining one step is $$t_{2,1} = d_{2,1} - \frac{d_{2,2}}{2} - \frac{d_{2,2}}{4}.$$

The width of the seven same steps in the third grating unit is $$t_{3,2} = \frac{d_{3,2}}{4},$$

while the width of the remaining one step is $$t_{3,1} = d_{3,1} - \frac{d_{3,2}}{2} - \frac{d_{3,2}}{4}.$$

And so on. That is, through Formulae 10 and 11, it is possible to determine the width of each step when there are two, four, eight, sixteen and more stages of steps. No repeated description is made herein.

In addition, regardless of whether the diffraction lens is a cylindrical lens or a spherical lens, the height and the width of the steps are calculated in the same manner, and no repeated description is made herein.

In the diffraction device of the present disclosure, there are provided diffraction units with different focal lengths, in each of which the orientation of the liquid crystal in the liquid crystal layer is controlled by electrodes such that the liquid crystal has two different refractive indices for the incident polarized light, i.e., a high refractive index and a low refractive index. When the liquid crystal is in the state of having the low refractive index for the incident polarized light, the diffraction unit may serve as a spherical lens or a cylindrical lens depending on the designed shape of the diffraction grating. When the liquid crystal is in the state of having the high refractive index for the incident polarized light, the diffraction unit can also serve as a plate glass. Therefore, the user can switch the diffraction device between a lens with different local lengths and a flat glass by selectively allowing the different diffraction units to be in different operation modes.

The above embodiments are merely exemplary embodiments of the present disclosure and are not intended to limit the present disclosure. The protection scope of the present disclosure is defined by the claims. Those skilled in the art can make various modifications or equivalent substitutions to the present disclosure within the spirit and scope of the present disclosure, which modifications or equivalent substitutions should also be considered to fall within the protection scope of the present disclosure.

What is claimed is:

1. A diffraction device comprising a first diffraction unit, the first diffraction unit comprising:
   a first substrate, provided with a first polarizer on one side thereof and a first electrode on the other side thereof;
   a first diffraction lens provided on the first electrode;
   a second substrate provided opposite to the first substrate, a second electrode is provided on a side of the second substrate facing to the first substrate; and
   a first liquid crystal layer, provided between the second electrode and the first diffraction lens, and having liquid crystal therein configured to be in a state in which the liquid crystal has a long axis direction parallel to an axial direction of a transmission axis of the first polarizer, or in a state in which the liquid crystal has a long axis direction perpendicular to an axial direction of a transmission axis of the first polarizer, and
   a second diffraction unit comprising:
   a third electrode, provided on a side of the second substrate away from the first substrate;
   a third substrate, provided symmetrical with the first substrate relative to the second substrate, and provided with a fourth electrode on a side thereof facing to the second substrate and a second polarizer on a side thereof away from the fourth electrode;
   a second diffraction lens, provided on the fourth electrode, and a second liquid crystal layer, provided between the second diffraction lens and the third electrode, and having liquid crystal therein configured to be in a state in which the liquid crystal has a long axis direction parallel to an axial direction of a transmission axis of the second polarizer, or in a state in which the liquid crystal has a long axis direction perpendicular to an axial direction of a transmission axis of the second polarizer.

2. The diffraction device according to claim 1, further comprising a plurality pair of diffraction units, each pair comprising the first diffraction unit and the second diffraction unit, and wherein the plurality pairs of diffraction units are arranged along the axial direction of the transmission axis of the first polarizer.

3. The diffraction device according to claim 1, wherein the first diffraction lens has a focal length different from that of the second diffraction lens.

4. The diffraction device according to claim 1, wherein when the liquid crystal in the first liquid crystal layer is in the state in which the long axis direction of the liquid crystal is perpendicular to the axial direction of the transmission axis of the first polarizer, and the liquid crystal in the second liquid crystal layer is in the state in which the long axis direction of the liquid crystal is parallel to the axial direction of the transmission axis of the second polarizer, a focal length of an object space in which the diffraction device is located and a focal length of an image space in which the diffraction device is located are of values f1 and f1', respectively, wherein when the liquid crystal in the first liquid crystal layer is in the state in which the long axis direction of the liquid crystal is parallel to the axial direction of the transmission axis of the first polarizer and the liquid crystal in the second liquid crystal layer is in the state in which the long axis direction of the liquid crystal is perpendicular to the axial direction of the transmission axis of the second polarizer, the focal distance of the object space where the diffraction device is located and the focal distance of the image side in which the diffraction device is located are of values f2 and f2', respectively, wherein:

$$\frac{f_1'}{f_1} = \frac{f_2'}{f_2} = -\frac{n_2}{n_1}$$

where $n_1$ is refractive index of medium in the object space in which the diffraction device is located, $n_2$ is refractive index of medium in the image space in which the diffraction device is located.

5. The diffraction device according to claim 4, wherein when the liquid crystal in the first liquid crystal layer is in the state in which the long axis direction of the liquid crystal is perpendicular to the axial direction of the transmission axis of the first polarizer and the liquid crystal in the second liquid crystal layer is in the state in which the long axis direction of the liquid crystal is perpendicular to the axial direction of the transmission axis of the second polarizer, the focal distance of the object space where the diffraction device is located and the focal distance of the image side where the diffraction device is located are of values f and f', respectively, wherein:

$$f = \frac{n_3 f_1 f_2}{n_1 (d - f_1' + f_2)}$$

$$f' = -\frac{n_3 f_1' f_2'}{n_2 (d - f_1' + f_2)}$$

where $n_3$ is refractive index of medium between the first diffraction unit and the second diffraction unit, and d is distance between the first diffraction lens and the second diffraction lens.

6. The diffraction device according to claim 1, wherein both the first diffraction lens and the second diffraction lens have a plurality of steps, and wherein the plurality of steps of a same diffraction lens are divided into a plurality of grating units, and the steps in a same grating unit has a height:

$$h = \frac{\lambda/N}{n - n_o}.$$

where $\lambda$ is wavelength of incident light, no is refractive index of the liquid crystal in the first liquid crystal layer in the state in which the long axis direction of the liquid crystal is perpendicular to the axial direction of the transmission axis of the first polarizer or of the liquid crystal in the second liquid crystal layer in the state in which the long axis direction of the liquid crystal is perpendicular to the axial direction of the transmission axis of the second polarizer, n is refractive index of the first diffraction lens or the second diffraction lens, and N is number of the steps included in each of the grating units.

7. The diffraction device according to claim 6, wherein each stage of steps in each of the grating units correspond a ring zone having radii of $r_{j,1}$ and $r_{j,2}$, wherein $$r_{j,1} = \left[\left(-f_1 + \frac{(2j-1)\lambda/2}{n_1}\right)^2 - f_1^2\right]^{1/2} = \sqrt{\frac{-(2j-1)f_1\lambda}{n_1}}\left(1 - \frac{(2j-1)\lambda}{4n_1 f_1}\right)^{1/2}$$

$$r_{j,2} = \left[\left(-f_1 + \frac{j\lambda}{n_1}\right)^2 - f_1^2\right]^{1/2} = \sqrt{\frac{-2jf_1\lambda}{n_1}}\left(1 - \frac{j\lambda}{2n_1 f_1}\right)^{1/2}$$

where $f_1$ represents focal length of the first diffraction lens or the second diffraction lens, j represents sequence number of the grating units, and $n_1$ represents refractive index of medium in the object space in which the diffraction device is located.

8. The diffraction device according to claim 1, wherein the second substrate is provided on a side thereof facing to the first substrate with a fifth electrode on which a first insulation layer is provided, wherein the second electrode is provided on the first insulation, and has a polarity opposite to that of the fifth electrode.

9. The diffraction device according to claim 8, wherein the second substrate is provided on a side away from the first substrate with a sixth electrode on which a second insulation layer is provided, and wherein the third electrode is provided on the second insulation layer, and has a polarity opposite to that of the sixth electrode.

10. The diffraction device according to claim 9, wherein both the second electrode and the third electrode are strip electrodes.

11. The diffraction device according to claim 10, wherein all of the first electrode, the fourth electrode, the fifth electrode and the sixth electrode are surface electrodes.

12. The diffraction device according to claim 1, wherein when the long axis direction of the liquid crystal in the first liquid crystal layer is parallel to the axial direction of the transmission axis of the first polarizer, refractive index of the first liquid crystal layer is the same as that of the first diffraction lens.

13. The diffraction device according to claim 12, wherein when the long axis direction of the liquid crystal in the second liquid crystal layer is parallel to the axial direction of the transmission axis of the second polarizer, refractive index of the second liquid crystal layer is the same as that of the second diffraction lens.

* * * * *